United States Patent [19]

Wahlquist et al.

[11] 4,379,192

[45] Apr. 5, 1983

[54] IMPERVIOUS ABSORBENT BARRIER FABRIC EMBODYING FILMS AND FIBROUS WEBS

[75] Inventors: Joseph D. Wahlquist, Woodstock; Jay Shultz, Roswell, both of Ga.

[73] Assignee: Kimberly-Clark Corporation, Neenah, Wis.

[21] Appl. No.: 391,247

[22] Filed: Jun. 23, 1982

[51] Int. Cl.³ .............................................. B32B 3/00
[52] U.S. Cl. ................................. 428/156; 128/132 D; 156/209; 156/220; 156/290; 428/171; 428/195; 428/198; 428/284; 428/286; 428/296; 428/297; 428/298; 428/303; 428/903; 428/913
[58] Field of Search .............. 428/195, 198, 284, 286, 428/287, 296, 297, 298, 302, 303, 903, 913, 156, 171, 172; 156/219, 220, 290, 291, 209; 128/132 D

[56] References Cited

U.S. PATENT DOCUMENTS

| | | | |
|---|---|---|---|
| 3,676,242 | 7/1972 | Prentice | 156/62.4 |
| 3,795,571 | 3/1974 | Prentice | 428/296 |
| 4,041,203 | 8/1977 | Brock et al. | 428/157 |
| 4,196,245 | 4/1980 | Kitson et al. | 428/903 |

*Primary Examiner*—James J. Bell
*Attorney, Agent, or Firm*—Leydig, Voit, Osann, Mayer and Holt, Ltd.

[57] ABSTRACT

An absorbent impervious barrier fabric in the form of a laminate has a fibrous section including a mat of polymeric melt blown microfibers and an impervious polymeric film adjacent said mat, said fibrous section and film being united in compacted bond regions formed by the application of heat and pressure and comprising pillars of bonds extending completely through the fabric from the outer surface where the fibrous elements are fused to the interface between the mat and the film where microfibers are fused to the film without disrupting the imperviousness of the film, the bond intensity tapering from said fused regions toward the essentially unbonded central plane of said mat to provide a double gradient in bond intensity in said pillars of bonds. One embodiment of the fabric has a fibrous section with a surface layer web of continuous and randomly deposited filaments and a microfiber mat with the web having intermittently discrete prebonded regions in addition to the compacted bond regions. Another embodiment has a fibrous section solely of a microfiber mat.

20 Claims, 4 Drawing Figures

IMPERVIOUS ABSORBENT BARRIER FABRIC EMBODYING FILMS AND FIBROUS WEBS

TECHNICAL FIELD

This invention relates to nonwoven fabrics particularly, but not exclusively, suited for end use as absorbent barrier fabrics in hospital products such as surgical drapes, and to methods of manufacturing such fabrics from laminates of films and fibrous webs including mats of microfibers.

BACKGROUND ART

Absorbent barrier fabrics are known, including the fabrics described in commonly assigned U.S. Pat. Nos. 3,668,050 and 3,669,106 which incorporate a liquid impervious film and a sheet of liquid absorbent foam material secured to a fibrous base sheet. Such barrier fabrics are useful in hospital products such as covers and surgical drapes and find particular utility as reinforcements in the area surrounding the fenestration of a surgical drape. Absorbent fabrics which are permeable and include mats of microfibers and an apertured film are disclosed in U.S. Pat. No. 4,196,245, which also discloses that areas of the film (column 11) may be non-apertured to obtain the equivalent of an impervious patch. Other absorbent barrier fabrics have been sold commercially under the Trademarks HI-LOFT® and DRY SITE®. These comprise fibrous webs laminated to films.

It is also known to employ mats of microfibers with films to provide nonwoven fabrics, U.S. Pat. No. 3,676,242 being an example of such fabrics produced by thermally bonding mats of microfibers to films. However, neither the surface nor the internal microfibers of the microfiber mats in these impervious nonwoven fabrics have been stabilized and, thus, the fabrics are not particularly suited for uses where textile-like materials are required.

Absorbent laminates of mats of microfibers and continuous filament webs are also known, for example, those described in U.S. Pat. No. 4,041,203, the combination of these components providing liquid repellency due to the small pore size of the microfiber mat and air permeability.

DISCLOSURE OF INVENTION

The principal object of this invention is to provide impervious absorbent barrier fabrics from laminates of fibrous webs and polymeric films, and bonding the laminates in such a manner as to obtain a stabilized abrasion resistant surface and stabilized internal structure with minimum loss of absorbent capacity of the inner plies of fibrous webs.

A further object of the invention is to provide impervious absorbent barrier fabrics from laminates of continuous filament webs, microfiber mats and polymeric films, utilizing the continuous filament webs and polymeric films as outer layers to provide one abrasion resistant absorbent surface and one liquid impermeable surface, and the microfiber mats to provide an uncompacted absorbent center layer retaining the small pore size and high capillarity characteristic of microfiber mats as initially formed.

Another object is to provide impervious absorbent barrier fabrics from laminates of microfiber mats and films bonded to obtain a fabric with textile-like properties for fields of use where such properties are desired.

Another object is to provide a method of making impervious absorbent barrier fabrics from mats of microfibers sandwiched between polymeric films and continuous filament webs and having surface abrasion resistance and internal stability.

Still a further object is to provide a method of manufacture which involves bonding such fabrics in a way to better utilize the overall absorbent capacity of the fabrics without producing pin holes or otherwise adversely affecting the imperviousness of the film.

Another object is to provide impervious absorbent barrier fabrics from mats of microfibers and polymeric films either with or without surface layers of continuous filament webs, the fabrics having substantial thickness and body and being strong and flexible for end uses such as absorbent pads, surgical drapes, coverings for hospital equipment, and other applications where an impervious absorbent barrier fabric with textile-like properties is required.

Another object is to provide impervious absorbent barrier fabrics which have a textured, abrasion resistant surface with a high coefficient of friction, useful for surgical drapes and other cover applications where a low-slip surface is desired.

BRIEF DESCRIPTION OF DRAWINGS

Additional objects and advantages of the present invention will become apparent upon reading the following detailed description of the invention taken in conjunction with the accompanying drawings in which.

BEST MODE FOR CARRYING OUT THE INVENTION

While the invention is described in connection with preferred embodiments, it is to be understood that the invention is not limited to those embodiments. On the contrary, all alternatives, modifications and equivalents as can be included within the scope and spirit of the invention defined in the appended claims are intended to be covered.

Where an absorbent barrier fabric is employed in a surgical drape in the area surrounding the fenestration, a variety of properties are required to satisfy the requirements for such use. These requirements have been recognized in the past but, to summarize, the material must be strong and abrasion resistant even when exposed to the liquids and physical contact encountered during a surgical procedure; the material must be liquid impervious to prevent the liquids encountered during operative procedures from striking through the sheet and to prevent the passage of bacteria through the sheet; the material must have a high frictional coefficient to prevent the dislodgement of surgical instruments and the like from the surface of the sheet during the operation; the material must be stable at the conditions encountered in sterilization treatments, either by steam or by ethylene oxide or the like; the material must be liquid absorbent to minimize liquid run-off during the operation; the material must have good draping characteristics.

When an absorbent barrier fabric is employed in other fields of use, such as for aprons, table covers or the like, many of these same requirements must be satisfied with the essential common requirements being surface and internal stability, absorbent capacity, laminate bulk and flexibility to provide textile-like properties.

In accordance with the present invention, an improved absorbent barrier fabric which satisfies all the foregoing requirements is provided by a laminate of liquid impervious polymeric film and a fibrous section which include mats of microfibers, the laminate being bonded under bonding conditions which produce bonding of the surface fibers for abrasion resistance and mechanical stabilization of the microfibers internally within the mat for integrity and retention of the wicking and absorbency properties of the microfiber mats.

Figure 1:
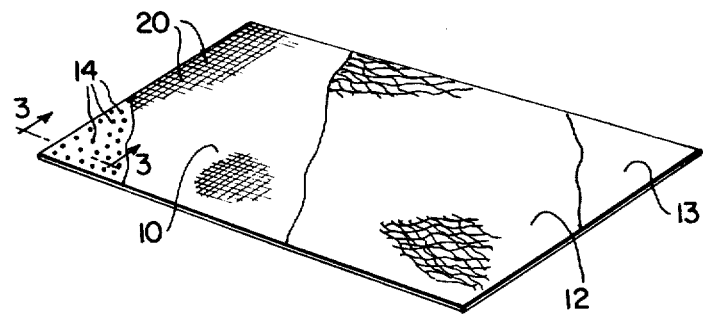
FIG. 1 is a schematic, fragmentary perspective view, with sections thereof broken away, of a nonwoven fabric constructed in accordance with the present invention.

Turning now to the drawings, FIG. 1 depicts an impervious absorbent barrier fabric constructed in accordance with the invention as a laminate having a fibrous section including a surface web 10 of prebonded continuous filaments and an inner uncompacted mat 12 of generally discontinuous, thermoplastic melt blown microfibers, and a polymeric film 13 adjacent the mat 12. In order to provide such a fabric with good abrasion resistance without compacting the fabric to a degree that the absorbent capacity of the mat 12 is materially diminished, the web 10 of continuous filaments is pattern bonded as a preliminary step before incorporation in the laminate and this is used as a base web and the mat 12 of microfibers formed by extrusion directly on the prebonded base web 10 of continuous filaments. By forming the microfiber mat 12 directly on the prebonded continuous filament web 10, primary bonds are created between the microfibers and the continuous filaments which attach the microfiber mat to the continuous filament web. Subsequent to the formation of the microfiber mat on the continuous filament web, a polymeric film 13 is introduced on the opposite exposed surface of the mat 12 of microfibers and the laminate is conducted to a nip of bonding rolls.

Construction of the bonding rolls and the bonding conditions in this nip are selected to produce a unique combination of higher and lower intensity bonds in regions 14 throughout the laminate to integrate the laminate components into a unitary structure with minimum loss of absorbent capacity and rate of the central layer of microfibers. Preferably, the bonding rolls include a smooth heated roll 16 and a patterned heated roll 18 which contains raised elements on its surface in the pattern desired, as shown schematically in FIG. 2, with the surface of the film 13 being brought against the smooth roll.

The preparation of mats of polymeric melt blown microfibers is well known and is described in an article entitled "Superfine Thermoplastic Fibers" appearing in *Industrial and Engineering Chemistry*, Volume 48, Number 8, (1965), pages 1342-1346, as well as in Buntin et al, U.S. Pat. No. 3,978,185, Prentice, U.S. Pat. No. 3,795,571 and Buntin, U.S. Pat. No. 3,811,957.

Figure 2:
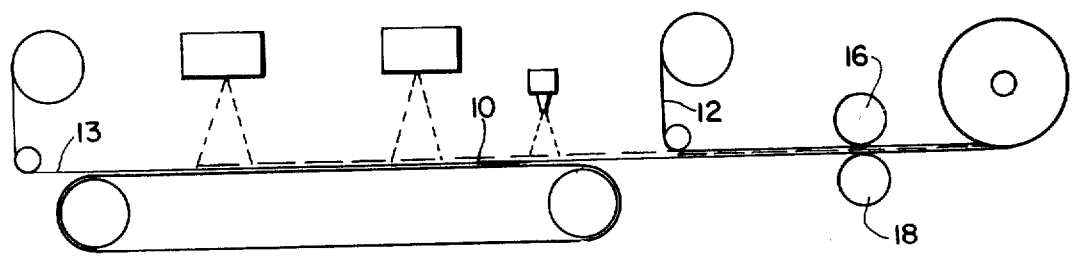
FIG. 2 is a schematic view of an apparatus for making nonwoven fabric of this invention.

As shown in FIG. 2, the method of formation involves extruding, from one or more melt blowing dies 6, molten polymeric material in fine streams and attenuating the streams by opposing flows of high velocity, heated gas to break the streams into discontinuous fibers of small diameter. According to the present invention, the fibers are formed into a mat directly on a prebonded web of continuous filaments. The mat possesses limited integrity due to entanglement of the individual microfibers in the mat as well as some degree of thermal or self bonding between the microfibers. In general, the microfibers contained in such mats have an average diameter of up to about 10 microns with very few of the microfibers exceeding 10 microns in diameter. Usually the average diameter of the microfibers in such mats is about 2-6 microns. While the microfibers in the mat are predominantly discontinuous, they generally have a length exceeding that normally associated with staple fibers. Due to the tackyness of the microfibers and the action of the gas streams in directing the microfibers at high velocity toward and through the base web, the microfibers bond directly to the continuous filaments of the base web and due to the open structure of the base web and the relatively smaller sizes of the microfibers, the microfibers penetrate the base web and entangle with the continuous filaments.

The preferred polymeric material for the microfiber mat is isotactic polypropylene resin; however, other thermoplastic polymeric resin capable of melt blowing may be used, including other polyolefins, polyurethanes, polyvinyls, polyamides and polyesters.

For the film 13 which is laminated to the mat 12 of microfibers, a wide variety of thermoplastic films are useful but non-oriented homopolymer polypropylene film is preferred. While the mat and film can be prepared from the same or different polymeric or copolymeric resins, it is essential that the two polymeric or copolymeric resins be compatible to secure adequate bonding. Compatibility may be determined conventionally by mixing the resins and coextruding filaments. To the extent there occurs an interface, phase separation or deterioration of properties, such as tensile strength, determines compatibility.

For the continuous filament web 10 preferably polypropylene resin is employed, the manner of formation of the continuous filaments being not particularly important and a variety of well known techniques being used. In general such techniques involve continuously extruding a polymer through a spinneret, drawing the spun filaments, and thereafter depositing the drawn filaments on a continuously moving surface in a substantially random fashion. Drawing serves to give the polymer filaments tenacity while substantially random deposition gives the web desirable isotropic strength characteristics. The Kinney U.S. Pat. Nos. 3,338,992 and 3,341,394, as well as other patents, such as Levy U.S. Pat. No. 3,276,944, illustrate useful techniques of initial web formation.

Another particularly useful technique is described in U.S. Pat. No. 3,692,618, the method therein disclosed permitting high rates of web formation. The thermoplastic polymer used in preparing the continuous filament web must be spinnable. Due to its low cost, bonding and physical property characteristics, predominantly isotactic polypropylene is preferred; however, other polymers such as other polyolefins, e.g., linear polyethylene and polyisobutylene, polybutadiene, polyurethanes, polyvinyls, polyamides and polyesters, can also be used. In addition, mixtures of the above polymers and copolymers prepared from monomers used in preparing the above pigments is useful.

While different ones of the above polymers or copolymers may be used for the continuous filament web, it is preferred to select the same polymer, copolymer or mixture for the web as for the other components of the laminated fabrics of this invention. Thus, it is preferred to have, for example, an all polypropylene or all polyester laminated fabric with the continuous filament web, the mat and the film made from the same thermoplastic resin. Thus, a polymer or copolymer may be chosen depending on the particular physical, chemical or biological properties desired. Compatability and immiscibility of the thermoplastic resins are more easily insured to facilitate obtaining the bonding strengths desired by choosing the same thermoplastic resin for all components of the laminated fabric.

For the fabrics of this invention, it is preferred to use light basis weight continuous filament webs 10 in the range of 0.3–1.5 oz/yd$^2$, with the filaments having an average fiber diameter in excess of about 12 microns and preferably 15–25 microns.

After formation on a moving carrier, the continuous filament web 10 is lightly compacted by passage between compaction rolls to cause slight consolidation and provide sufficient integrity for further processing. Bonding of such a continuous filament web to achieve stabilization is accomplished by passing the web through the pressure nip formed by a heated smooth roll and a heated pattern roll which contains a plurality of raised points on its surface. The pattern of raised points should be such that the total bonded area of the web is between about 14–40 percent of the total web area. Bond densities of between about 100–500 compacted areas/in$^2$ are preferred for continuous filament webs used in the laminates of this invention, having average filament diameters between about 12–25 microns. While the pattern of the compacted areas in the continuous filament web may be varied, a diamond pattern 20 (FIG. 1) is preferred. Bonding of continuous filament webs to provide suitable webs for this invention is described in detail in U.S. Pat. No. 3,855,046, to which further reference may be made.

According to this invention, the bonding conditions in the bonding nip are controlled both to achieve attachment between the film 13 and the microfiber mat 12 and to further stabilize the continuous filament web 10 and integrate the web 10 with the microfiber mat 12 without materially compacting the microfiber mat 12 or introducing excessive fused bond areas that reduce the bulk and absorbent capacity of the microfiber mat. To this end, the rolls 16, 18 are heated and pressure conditions in the nip between the heated rolls are controlled to achieve a gradient in the intensity of the bonds in the Z direction from a condition of greatest intensity at both surfaces to a condition of lowest intensity internally within the mat.

To achieve this Z direction "double" gradient while also producing a three dimensional configuration in the surface of the fabric, it is preferred that the surface of the continuous filament web 10 is brought against the patterned roll 18 in the nip and the film 13 is brought against the smooth roll 16 while the roll temperatures and nip pressures are closely controlled. In keeping with the invention, at the preferred roll temperatures and nip pressures, the elements on the roll 18 are caused to penetrate the continuous filament web, which has a thin open structure, into the dense subformation of the microfiber mat. While the continuous filament web has an open matrix and is virtually transparent, the subformation of microfibers is a dense, thick mat which is opaque. The patterned roll, due to the driving force of the heat from the raised elements, overcomes the insulative effect of the continuous filament web and fuses the filaments and microfibers in the discrete areas of the raised elements and produces a visible dominating pattern in the surface of the laminate. In addition, the surface of the laminate is shaped by the raised elements on the surface of the patterned roll 18 into a three dimensional configuration with the textured appearance illustrated in FIG. 3; additional surface stability is also obtained as the filaments and microfibers are bonded not only in the bond regions 14 but the filaments also are adhered cohesively outside the bond regions. Furthermore, by bringing the fibrous section against the patterned roll, the fibers appear to function as energy absorbers thus reducing the thermal effect of the patterned roll against the film and preventing the development of pin holes in the film. From a bonding standpoint, it is believed that the film should have a lower crystallinity than the microfibers of the adjacent layer to minimize the energy required to bond the film to the fibers by melting the film to make it immiscible with the microfibers. Desirably the film should have minimum crystallinity (be essentially amorphous) to minimize the energy required for bonding.

In addition to providing a textured surface, in carrying out the invention it is also desired to retain the absorbency potential of the microfiber mat 12 by avoiding overall permanent compaction. Thus, the laminate is conducted to the bonding nip without prior compaction which is customary in the formation of continuous filament webs. The most preferred patterned roll has less than about 15 percent bond areas, providing relieved areas on the major portion of its surface which avoids web compaction, the relieved areas having an engraved depth substantially equal to the thickness of the unbonded fibrous section. This minimizes web compaction yet stabilizes the surface by causing the surface fibers to be lightly bonded. Furthermore, the preferred bonding pattern involves raised pin elements which are spaced at least the diameter of the pins, leaving large relieved areas between the pins instead of small areas that may be bridged by filaments as the bonding takes place to cause undue compaction.

Further, the pressure and temperature conditions in the nip are closely controlled to confine the bonding of microfibers to form, in effect, pillars 22 of bonded fibers beneath the fused bond regions 14 at the surface of the laminate. It is preferred that a double gradient of bond intensity be produced, evidenced by lowest intensity of bonding between microfibers approximately in the central plane of mat 12. At the base of the pillars, the microfibers are fused to the film 13 by bonds having a greater intensity than the internal bonds; however, the microfibers do not become an integral part of the film 13 at the interface between the mat 12 and the film 13. One of the major objectives of this invention is to provide a bonded structure between microfibers and between microfibers and film 13 without the development of barrier defeating pin holes in the film 13. These are avoided by controlling the temperature, dwell time in the nip and nip pressure to avoid excessive melting or crystallinity increase of the film. It is also preferred to locate the film 13 against the smooth roll 16 of the pair and thus strain the film less than would occur with a patterned roll against the film. Under optimum bonding conditions a permanent change in the film occurs at the base of the pillars of bonded microfibers but no pin holes are produced. This change in the film can be demonstrated by stripping the mat 12 from the film 13 and stretching the film. Failure of the film first occurs, generally, in the smooth bond regions where the embossing has been erased, evidencing an increase in crystallinity without disruptions in imperviousness. Openings first appear in these smooth regions and the failures propogate from these small openings.

By the microfibers retaining their identity throughout the pillars of bonded microfibers except in the fused surface regions which form depressions in the surface, the finely divided porous structure in the X-Y directions of the mat 12 is substantially retained to provide high absorbent capacity. Furthermore, the fused bond regions slow the lateral flow of liquid in the mat due to gravity when the fabric is positioned in a vertical direction, as on a patient. Liquid will tend to spread out and flow around the fused bonded regions, thereby increasing the lateral wicking action and more effectively utilizing the absorbent capacity of the mat.

As previously indicated, for the mat of microfibers the preferred material is isotactic polypropylene. The preferred resins have a melt index of between 30 to 500 g/10 min. using 2160 g. load measured at 190 degrees C. and a preferred resin is Hercules PC973. For the film, the preferred material is a non-oriented homopolymer polypropylene film, about 0.0006 to 0.0016 inches in thickness and embossed to improve flexibility. With the previously specified combination of preferred materials for continuous filament web, mat and film, to provide the optimum bond structure, the pattern bonding roll is held at a temperature of between about 300 degrees to 350 degrees F., depending on dwell time, preferably 330 degrees F., in combination with nip pressures (psi on raised points) between about 10,000 to 50,000 psi. The smooth roll 16 is heated to 220-260 degrees, preferably 240 degrees, to achieve attachment between film and microfiber mat. It will be noted that the pattern roll 18 is heated to a substantially higher temperature than the smooth anvil roll. Since the continuous filament web is prebonded, a crystallinity change has been produced which substantially increases the softening temperature of the filaments. To bond the filaments of the surface layer 10 and to overcome the insulative effect of this layer and bond the microfibers of the mat 12, a higher pattern roll temperature has been found satisfactory; the lower anvil roll 16 temperature is effective to bond the film and microfibers at the film/mat interface without developing pin holes. It is important to control all the bonding parameters, e.g., temperature, pressure and dwell time in the nip, to obtain the preferred bonding characteristics in the finished product.

Another parameter that may be varied is the bond pattern. While different bonding patterns may be used, it is preferred to utilize patterns of lines or dots to form the bond regions and most preferred is the dot pattern disclosed in commonly assigned U.S. Design Pat. No. 239,566, which may be produced by pins on the patterned roll 18. A preferred pattern is provided by patterned rolls having pins in the range of from about 20 to 250 pins/in$^2$ and preferably within 50 to 225 pins/in$^2$ with a percent area of bond coverage in the range of from about 5 to 30 percent.

The basis weight of the mat of microfibers may also be varied according to the desired end use. Basis weights in the range of from about 1.0 oz/yd$^2$ to about 3.5 oz/yd$^2$ for the mat of microfibers have been generally utilized, although higher and lower basis weights would be satisfactory within a range of about 0.3 oz-/yd$^2$ to 4.0 oz/yd$^2$ generally being most useful for fabric and absorbent pad type applications.

When it is desired to utilize fabrics of this invention in fields making use of the absorbent capacity of microfiber mats of polyolefin microfibers for absorbing aqueous solutions, the microfiber mats are treated with a surfactant to make the microfibers wettable. When maximum utilization of absorbent capacity is desired, the preferred treatment method is to apply a suitable surfactant, such as Aerosol OT (dioclylester of sodium sulfosuccinic acid), in a spray to the microfibers before formation into a mat in an amount of 0.1 to 0.6 percent by weight, when the mat is composed of melt blown microfibers of polypropylene resin. Other surfactants may be used. By applying the surfactant to the microfibers, the microfibers, per se, are wettable and maximum utilization of absorbent capacity of a mat formed from such microfibers is insured. When something less than maximum utilization of absorbent capacity suffices, surfactant may be applied to the surface of a formed mat of microfibers instead of to the microfibers before formation. With such procedures, the surface microfibers become wettable while the underlying microfibers are not wettable and the maximum absorbent rate of the mat is not attained. However, for some fields of use, that may be preferred and the lesser amount or lower level add-on surfactant used is reflected in lower cost.

It is also important to treat the web of continuous filaments with a surfactant to attain maximum absorbent rate of the fabrics. Furthermore, for hospital related end uses for the fabrics of this invention, it is desired to treat the fabrics so that they become electrically conductive to prevent the build-up of a static charge. A preferred way of achieving this result is to apply a conventional salt solution, such as lithium nitrate, to the web of continuous filaments before formation of the microfiber mat. The surfactant and salt solution desirably are combined and applied to the filament web. It has been found, surprisingly, that such a treatment of the filament web to render it electrically conductive is effective as an antistatic treatment for the entire fabric after the web has been bonded to the microfiber mat in accordance with the previously described procedures. Apparently the microfiber mat, after treatment with the preferred surfactant, is rendered sufficiently conductive to allow charge to flow to the surface continuous filament web and dissipate.

The laminar structure hereinbefore described provides an impervious absorbent barrier fabric with a highly abrasion resistant surface with tied down filaments and microfibers that do not slough free of the surface. The abrasion resistance is due to the higher denier filaments and the stability is due to the intermittent bonding of the continuous filament web.

With respect to the continuous filament web surface, the abrasion resistance is believed to be attributable to the fact that the filaments are strongly held within the discrete bond areas without breakage, thus avoiding the presence of long filament spans which would tend to "fuzz-up" during use.

Figures 3, 4:
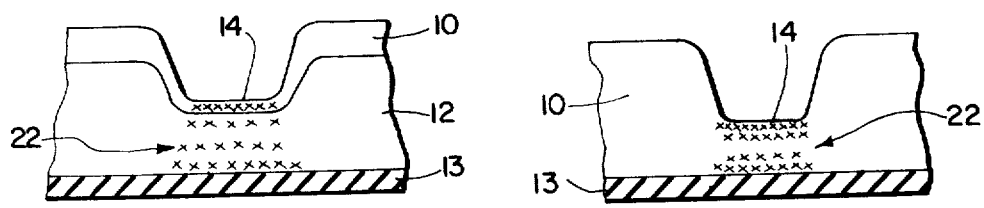
FIG. 3 is a sectional view looking along line 3—3 of FIG. 1.
FIG. 4 is a sectional view of another nonwoven fabric constructed in accordance with the invention.

In further keeping with the present invention, an alternative form of laminate providing an absorbent barrier fabric is illustrated in FIG. 4. In this form of the invention, the laminate is comprised of a mat of microfibers 12 attached to a film 13 by intermittent bonds. To manufacture this laminate, a mat of microfibers formed on a foraminous screen or drum by extrusion from one or more melt blowing dies (of the type illustrated in FIG. 1) is associated without prior compaction with a polymeric film 13 and conducted through a nip of bonding rolls 16, 18.

Preferably, the bonding rolls comprise, as shown in FIG. 1, the combination of a patterned roll 18 and a smooth anvil roll 16 with the microfiber mat 12 brought against the patterned roll 18 and the film 13 brought against the smooth roll 16. As in the case of the preferred form of the invention, the rolls are heated and the temperature and speed of rotation and laminate movement are controlled to produce fusion of the microfibers to the film at the mat/film interface, pattern bonding of the mat surface and a double gradient of bond intensity in the Z direction with the center of the mat being soft and essentially unbonded. The laminar structure is not compacted by pressure rolls between the web forming apparatus and the pattern bonding rolls so that an uncompacted laminar structure is presented to the pattern bonding rolls for bonding into an integrated structure. The raised area on the bonding rolls is very limited, as previously described in connection with the FIG. 3 embodiment of the invention, most preferably less than 15 percent of the total area so as to limit the compaction of the laminate to within the areas opposite the raised elements of the pattern bonding rolls.

Passage of the laminate through the bonding nip with the microfiber mat 12 against the patterned roll 18 also is effective to produce a three dimensional configuration in the surface of the mat. This is desired to increase the coefficient of friction of the surface and also is important to increase the abrasion resistance of the surface.

As disclosed in Buntin et al, U.S. Pat. No. 3,978,185, in the formation of the microfiber mat, the surface may be stabilized by operating the melt blowing dies in conjunction with the flow of heated air so as to produce on the surface of the mat "shot", which are globs of polymer. The production of excessive coarse "shot" may adversely affect the appearance and strength properties of the mat. The production of "shot" is related to gas flow rates at any given resin flow rates and the size and frequency of "shot" may be adjusted by varying gas flow rates at fixed resin rates. In carrying out this invention, to provide a finished fabric having a mat surface with maximum abrasion resistance, in the production of the mat the gas flow rate is adjusted to produce fine "shot" on the surface of the mat. Fine "shot" on the surface provides abrasion resistance while not resulting in a hard, sandpaper-like surface.

In keeping with the invention, at the preferred roll bonding temperatures and nip pressures, the microfibers in the mat 10 which contact the elements on the roll 18 are caused to fuse in the bond regions 14. This is evidenced by a film-like translucent appearance caused by the apparent substantial melting and/or crystallinity increase of the microfibers and the loss of identity of each of the microfibers within the bond regions 14 while outside the bond regions and the microfibers are adhered but retain their identity. In this manner, the outer surface of the mat 10 is shaped by the raised elements on the surface of the patterned roll 18 into a three dimensional configuration with the textured appearance illustrated in FIG. 4, and the microfibers are bonded not only in the bond regions 14 but also are adhered in the surface of the fabric outside the bond regions to stabilize the surface of the mat and enhance abrasion resistance.

The surface of the fabric preferably has a high frictional coefficient, which may be measured as described below, at least about 20 degree slip angle and preferably 25 degree slip angle or greater, to provide a surface from which instruments or other objects will not slide when the fabrics are employed, for example, in surgical drapes or like products.

It will be recognized, however, that the preferred form of laminate with the fibrous section having a prebonded continuous filament web 10 on the surface has significantly greater abrasion resistance and strength, as well as resistance to sloughing of filaments and microfibers due to the screening effect of the continuous filament web 10. For end uses where such properties are desired, that is the preferred material. For other end uses where abrasion resistance or low lint properties are not as critical, as in the case of table covers or household products such as bibs and aprons, the fibrous section may consist of a microfiber mat providing a soft textured surface, absorbent capacity, barrier property and lower cost.

The proportion of continuous filament web included in the fibrous section of the finished laminate is determined by the abrasion resistance and strength characteristics that are desired for a particular end use. Likewise, the proportion of microfiber mat included is determined by the absorbent rate and capacity properties desired. Thus, the continuous filament web may vary from 0 to about 75 percent of the fibrous section and, conversely, the microfiber mat may vary from about 25 to 100 percent of the fibrous section, depending on the level of either property (i.e., absorbency characteristic versus abrasion resistance/strength) desired for the finished laminate.

Also, in accordance with this invention, the content of the microfiber mat in the fibrous section may be varied to increase or decrease the absorbency, as desired, within the ability of such mats to provide absorbency without, at the same time, increasing or decreasing the strength of the finished laminate. It is not necessary to over design strength characteristics of the laminated structure to obtain a desired absorbency; conversely, it is not necessary to over design the absorbency characteristic to obtain the desired abrasion resistance/strength. While the pattern bonding provides an integrated structure, the absorbency, abrasion resistance and strength of the finished structure may be varied by selection of the continuous filament web and mat content and proportions in the fibrous section.

A further advantage of the invention is that it permits the manufacture at low cost of fabrics with a combination of abrasion resistance, strength, absorbency and imperviousness. By utilizing component layers of thermoplastic materials, the layers may be bonded into a finished laminated fabric without the introduction of adhesives solely by use of heat and pressure. The number of process steps to manufacture the finished laminated fabric is held to a minimum, thus permitting manufacture at low cost, by (a) forming the mat directly on the prebonded continuous filament web to provide the fibrous section, (b) combining the fibrous section and film, and (c) taking the combination directly to the pattern bonding station to provide an integrated structure.

As previously mentioned, an important feature of the invention is the provision of a laminated fabric with the desired absorbency and barrier properties from layers manufactured using the same thermoplastic material. It is preferred to use all polypropylene and, when so manufactured, the finished fabrics have a number of desired properties for products intended for use in the medical field.

For example, they have better flammability properties than untreated cellulose fiber fabrics and do not require the introduction of treatment chemicals that may cause problems when brought into contact with humans. These fabrics are biologically inert, chemically inert, mildew resistant and can absorb acid and alkaline solutions without degradation. Because of the inertness, they are preferred for applications where they are used in contact with or adjacent the skin of humans; they are also steam sterilizable with substantially no change in their physical properties.

Referring to Table 1, the characteristics are given of fabrics A, B and C made according to the invention together with characteristics of four other fabrics labeled I–IV. Fabric A is a laminate of a very light weight continuous filament web and a microfiber web and film. Fabrics B and C are laminates of microfiber webs and films of different basis weights. The film in A, B and C fabrics is embossed, non-oriented 0.0006 inch polypropylene film. The melt blown microfiber mat component of fabrics A and C has a basis weight of 2 oz/yd$^2$ and of fabric B has a basis weight of 1 oz/yds$^2$. In all examples, the resin used for the mat was isotactic polypropylene and dioclylester of sodium sulfosuccinic acid (Aerosol OT), an anionic surfactant, was applied to the mat in a quench spray after the mat was formed in an amount of between about 0.1% to 0.6% by weight of the finished mat. Fabric A incorporated a continuous filament web with a basis weight of 0.375 oz/yd$^2$ and the resin used was isotactic polypropylene. Web bonding was achieved in all cases with a pair of heated rolls, one of the heated rolls having pins on its surface in a dot pattern, as shown in U.S. Design Pat. No. 239,566, having about 125 pins/in$^2$ and the other being a smooth roll, which results in a three dimensional surface as indicated in FIGS. 3 and 4. The temperature and pressure conditions were within the preferred ranges given above.

Example I in the Table is a film-foam laminate of the type described for use as a surgical drape fenestration reinforcement in Donnelly U.S. Pat. No. 3,668,050. As such, it comprises a 1.5 mil polyethylene film and a 40 mil open celled polyurethane foam. These base materials were adhesively laminated.

Examples II, III and IV are commercially available fenestration reinforcement fabrics for hospital drapes. Example II is sold under the trademark HI-LOFT ®, Example III under the trademark DRI-SITE ® and Example IV under the trademark FLO-GUARD ®.

For the end use of a fenestration reinforcement for a surgical drape, Table 1 provides a comparison of selected characteristics of fabrics A, B and C of this invention with commercial materials. The characteristics given are absorbent capacity and efficiency, slip resistance, strength and abrasion resistance.

ABSORBENT CAPACITY AND EFFICIENCY

This test is performed according to Federal Government Specification UU-T-595b. It is made by cutting a test sample 4"×4", weighing it, and then saturating it with water for three minutes by soaking. The sample is then removed from the water and hung by one corner for 30 seconds to allow excess water to be drained off. The sample is then re-weighed, and the difference between the wet and dry weights is the water pickup of the sample expressed in grams per 4"×4" sample. Efficiency is obtained by dividing the total water pick-up by the dry weight of the sample.

SLIP RESISTANCE

Slip resistance or frictional coefficient is measured by attaching the surface to be tested to an adjustable inclined plane. A stainless surgical instrument is placed on the surface to be tested and the angle of the plane is adjusted until the instrument begins to slip, which angle is the recorded slip angle. The data for the Examples was obtained using a stainless steel hemostat.

TRAPEZOIDAL TEAR

Fed. Standard 191 Method 5136.

GRAB TENSILE

Fed. Standard 191 Method 5102.

ABRASION RESISTANCE

Abrasion measurements are made using the standard Taber abrasion method for indicating the surface abrasion resistance. The results are obtained in abrasion cycles to failure. Failure is deemed to occur at that point where a noticable portion of the surface subjected to abrasion in the test exhibits a fuzzy, pile-like appearance.

Abrasion measurements are made using a Taber Standard Abrader (Model 140PT) with a rubber calibrase No. S-32 wheel on the right abrading head and a 125 gram counterweight (total load of 125 grams).

Reviewing the results given in the Table, the absorbent capacity and efficiency for fabrics A, B and C are comparable with the film-foam laminate of Example I and for the competitive material Example III, and better than the materials of Examples II and IV. The absorbency characteristics given for the A, B and C fabrics are acceptable for the end use of a fenestration reinforcement for a surgical drape, as well as for other hospital aimed end uses.

Slip resistance for the A, B and C fabrics is less than for Example I but comparable or better than the material of Examples II, III and IV. The slip resistance values for fabrics A, B and C are well above minimum commercial standards for such an end use.

Strength characteristics are given in terms of both trapezoidal tear values and grab tensile values. Fabrics A, B and C are comparable with the competitive products and meet commercial requirements.

The abrasion resistance improvement which the surface layer of continuous filament web contributes indicated that the Fabric A form of the invention would be preferred in end uses where abrasion resistance is an important property, such as in fenestration area reinforcement. Table covers and other draping end uses, where the material surface is not exposed to heavy abrading conditions, are well suited for fabrics B and C.

TABLE 1

| A | B | C | I | II | III | IV |
|---|---|---|---|----|-----|----|
| .375 oz/yd$^2$ | 1 oz/yds$^2$ | 2 oz/yds$^2$ | | | | |
| 2.0 oz/yd$^2$ | .6 mil film | .6 mil film | | | | |
| .6 mil film | | | | | | |

TABLE 1-continued

| | A | B | C | I | II | III | IV |
|---|---|---|---|---|---|---|---|
| Absorbent Capacity (Grams) | 4.07 | 3.88 | 4.58 | 6.11 | 4.47 | 5.41 | 2.61 |
| Efficiency (Grams of Water/Grams of Substrate) | 4.43 | 5.30 | 5.16 | 8.65 | 2.52 | 4.53 | 2.51 |
| Slip Resistance (Slip Angle Degree) | 25 | 32 | 34 | 38 | 20 | 24 | 20 |
| Trap Tear CD(lb) | 4.2 | 2.9 | 3.4 | 4.4 | 2.4 | 0.9 | 88 |
| Grab Tensile MD(lb) | 18.3 | 9.4 | 16.8 | 9.1 | 10.5 | 10.6 | 18.3 |
| CD(lb) | 16.1 | 8.1 | 13.7 | 9.1 | 7.2 | 11.6 | 12.4 |
| Taber Abrasion | 33 cycles | 9 cycles | 8 cycles | 28 cycles | 100+ cycles | 22 cycles | 31 cycles |

We claim:

1. An absorbent impervious barrier fabric comprising a fibrous section including a mat of polymeric melt blown microfibers with an average diameter of up to about 10 microns and a basis weight between about 0.3 oz/yd² and 4.0 oz/yd², and an impervious polymeric film between about 0.0006 and 0.0016 inches thick adjacent said mat, said fibrous section and film being united in a pattern of compacted bond regions occupying less than about 15 percent of the total area and formed by the application of heat and pressure, said bond regions comprising pillars of bonds extending completely through the fabric from the outer surface where the fibrous elements are fused, to the interface between the mat and the film where the microfibers are fused to the film and the film has increased crystallinity in the bond regions without disruptions in the imperviousness of the film, the bond intensity tapering from said fused regions toward a low bonding level in the central plane of said mat to provide a double gradient in bond intensity in said pillars of bonds, the surface of the fibrous section of the fabric having a shape formed by depressions in the bond regions, providing a three dimensional configuration.

2. The nonwoven fabric of claim 1 wherein said fibrous section which includes said microfiber mat further includes a surface layer web of continuous and randomly deposited molecularly oriented filaments of a thermoplastic polymer with an average filament diameter in excess of about 12 microns, said web having intermittently discrete prebonded regions formed by the application of heat and pressure, the combination of said prebonded regions and said fused regions providing a stabilized abrasion resistant, textured surface.

3. The nonwoven fabric of claim 2 wherein said microfibers are entangled and bonded with the filaments of said continuous filament web as the mat is formed.

4. The fabric according to claims 1, 2 or 3 wherein the surface of said fibrous section has a slip resistance of at least about 20 degrees.

5. The fabric according to claim 1 wherein said fibrous section consists essentially of said microfiber mat and the microfibers are fused in the bond regions in the surface of said mat to stabilize the surface of the fabric.

6. The fabric according to claims 1, 2, 3, or 5 including surfactant on the surface of microfibers of said mat to increase absorbent capacity of said mat for aqueous solutions.

7. The fabric according to claims 2 or 3 including a salt on the continuous filaments to increase conductivity of said fabric.

8. The fabric according to claims 1, 2, 3, or 5 wherein said polymeric microfibers, said polymeric filaments and said polymeric film are of compatible polymers, copolymers or mixtures thereof from the group consisting of polyolefins, polyurethanes, polyvinyls, polyamides, and polyesters.

9. The fabric according to claim 8 wherein the microfibers, filaments and film are all made from the same polymers, copolymers or mixtures thereof.

10. The fabric according to claims 1, 2, 3, or 5 wherein the microfibers, filaments and film are polypropylene.

11. A process for the manufacture of an absorbent impervious barrier fabric comprising:
forming a fibrous section including a mat of polymeric melt blown microfibers with an average diameter of up to about 10 microns and a basis weight between about 0.3 oz/yd² and 4.0 oz/yd²;
bringing an impervious polymeric film between about 0.0006 and 0.0016 inches thick adjacent said mat;
passing said fibrous section and said film through the nip between heated rolls, with one of said rolls in contact with said fibrous section having a pattern of raised areas occupying less than about 15 percent of the surface of the roll and the other roll in contact with said film having a smooth surface, and applying pressure to said fibrous section and film by means of said rolls so as to form bond regions in said fabric;
controlling the temperature of the rolls and the nip pressure to form pillars of bonds extending completely through the fabric from the outer surface where the fibrous elements are fused, to the interface between the mat and the film where the microfibers are fused to the film and the film has increased crystallinity in the bond regions without disrupting the imperviousness of the film, and to shape the surface of the fibrous section of the fabric to provide depressions in the bond regions and a three dimensional surface configuration.

12. The process of claim 11 wherein said step of forming a fibrous section includes providing a web of continuous and randomly deposited molecularly oriented filaments of a thermoplastic polymer with an average filament diameter in excess of 12 microns, said web having intermittent discrete prebonded regions formed by the application of heat and pressure, and forming said mat of microfibers on said prebonded continuous filament web so as to entangle and provide primary bonds between the microfibers and the filaments of said fibrous section.

13. A process for the manufacture of an absorbent impervious barrier fabric comprising:
providing a web of continuous and randomly deposited molecularly oriented filaments of a thermoplastic polymer with an average filament diameter in excess of 12 microns, said web having intermittent discrete prebonded regions formed by the application of heat and pressure;

forming a mat of polymeric melt blown microfibers with an average diameter of up to about 10 microns and a basis wieght between about 0.3 oz/yd² and 4.0 oz/yd² on said web so as to entangle and provide primary bonds between the microfibers and the filaments and provide a fibrous section;

bringing an impervious polymeric film between about 0.0006 and 0.0016 inches thick adjacent the surface of said mat of said fibrous section;

passing said fibrous section and said film through the nip between heated rolls, with one of said rolls in contact with said fibrous section having a pattern of raised areas occupying less than about 15 percent of the surface of the roll and the other roll in contact with said film having a smooth surface, and applying pressure to said fibrous section and film by means of said rolls so as to form bond regions in said fabric; and controlling the temperature of the rolls and the nip pressure to form pillars of bonds extending completely through the fabric from the outer surface where the fibrous elements are fused, to the interface between the mat and the film where the microfibers are fused to the film and the film has increased crystallinity in the bond regions without disrupting the imperviousness of the film, and to shape the surface of the fibrous section of the fabric to provide depressions in the bond regions and a three dimensional surface configuration.

14. The process of claim 13 wherein said microfibers, filaments and film are polypropylene.

15. The process of claim 14 wherein said pattern roll is heated to a temperature between about 300–500 degrees F. and said smooth roll is heated to a temperature between about 200–260 degrees. F..

16. The process of claim 15 wherein a varying bond density is obtained in said mat which decreases from said fused regions towards a low bonding level in the central plane of said mat to provide a double gradient in bond intensity in said pillars of bonds.

17. The process of claims 11, 12 or 13 wherein said polymeric microfibers are polypropylene, further including applying surfactant in a spray to the microfibers after extrusion and before formation into a mat to make the polypropylene microfibers wettable and to enhance utilization of the absorbent capacity of the mat for aqueous solutions.

18. The process of claim 11 wherein said polymeric microfibers and said polymeric film are polypropylene.

19. The process of claims 12 or 13 wherein said polymeric microfibers, said polymeric filaments and said polymeric film are of the same polymer, copolymer or mixtures thereof from the group consisting of polyolefins, polyurethanes, polyvinyls, polyamides and polyesters.

20. The process of claims 12, 13, 14, 15, 16, or 18 further including applying surfactant to the mat to make the polypropylene microfibers wettable and improve utilization of the absorbent capacity of the mat for aqueous solutions.

* * * * *